United States Patent
Stellwag et al.

(10) Patent No.: US 9,947,425 B2
(45) Date of Patent: Apr. 17, 2018

(54) METHOD FOR REDUCING THE RADIOACTIVE CONTAMINATION OF THE SURFACE OF A COMPONENT USED IN A NUCLEAR REACTOR

(71) Applicant: AREVA GmbH, Erlangen (DE)

(72) Inventors: Bernhard Stellwag, Nürnberg (DE);
Luis Sempere-Belda, Erlangen (DE);
Ute Ramminger, Roth (DE)

(73) Assignee: AREVA GMBH, Erlangen (DE)

( * ) Notice: Subject to any disclaimer, the term of this patent is extended or adjusted under 35 U.S.C. 154(b) by 0 days.

(21) Appl. No.: 14/909,903

(22) PCT Filed: Aug. 8, 2014

(86) PCT No.: PCT/EP2014/067088
§ 371 (c)(1),
(2) Date: Feb. 3, 2016

(87) PCT Pub. No.: WO2015/022270
PCT Pub. Date: Feb. 19, 2015

(65) Prior Publication Data
US 2016/0196889 A1    Jul. 7, 2016

(30) Foreign Application Priority Data

Aug. 14, 2013  (DE) .................. 10 2013 108 802
Feb. 26, 2014  (DE) .................. 10 2014 102 487

(51) Int. Cl.
*G21F 9/30*    (2006.01)
*G21C 17/022*  (2006.01)
(Continued)

(52) U.S. Cl.
CPC ............... *G21F 9/30* (2013.01); *G21C 13/08* (2013.01); *G21C 17/0225* (2013.01);
(Continued)

(58) Field of Classification Search
None
See application file for complete search history.

(56) References Cited

U.S. PATENT DOCUMENTS 5,093,073 A * 3/1992 Schenker ............... G21F 9/004
376/305
2003/0015475 A1   1/2003 Liebig et al.
(Continued)

FOREIGN PATENT DOCUMENTS

CN   101809675 A    8/2010
CN   102209992 A   10/2011
(Continued)

OTHER PUBLICATIONS

International Application No. PCT/EP2014/067088 International Preliminary Report on Patentability dated Feb. 25, 2016 (9 Pages).

*Primary Examiner* — Nathan T Leong
(74) *Attorney, Agent, or Firm* — Keller Jolley Preece

(57) ABSTRACT

The invention relates to a method for reducing the radioactive contamination of the surface of a component used in a nuclear reactor, which component is in contact with radioactively contaminated water, in which method a hydrophobic film is produced on the surface of a component by virtue of the surface being wetted with an aqueous solution which contains a film-forming amphiphilic substance.

21 Claims, 4 Drawing Sheets

(51) Int. Cl.
*G21C 19/28* (2006.01)
*G21F 9/00* (2006.01)
*G21F 9/28* (2006.01)
*G21C 13/08* (2006.01)
*G21C 21/00* (2006.01)

(52) U.S. Cl.
CPC .............. *G21C 19/28* (2013.01); *G21C 21/00* (2013.01); *G21F 9/004* (2013.01); *G21F 9/28* (2013.01); *Y02E 30/40* (2013.01)

(56) References Cited

U.S. PATENT DOCUMENTS

2005/0135542 A1* 6/2005 Stellwag .............. C23F 11/122
    376/277
2006/0264650 A1* 11/2006 Arora .................... C07F 7/1836
    556/485

FOREIGN PATENT DOCUMENTS

| | | |
|---|---|---|
| DE | 100 13 865 A1 | 10/2001 |
| DE | 10 2007 029 836 A1 | 1/2009 |
| DE | 10 2007 038 947 A1 | 2/2009 |
| DE | 10 2009 002 681 A1 | 9/2010 |
| DE | 10 2012 203 010 A1 | 8/2013 |
| JP | H08-297195 A | 11/1996 |
| TW | 554434 B | 9/2003 |
| WO | 2002/093586 A2 | 11/2002 |
| WO | WO2010094692 * | 2/2010 |
| WO | 2010/094692 A1 | 8/2010 |

* cited by examiner

METHOD FOR REDUCING THE RADIOACTIVE CONTAMINATION OF THE SURFACE OF A COMPONENT USED IN A NUCLEAR REACTOR

CROSS-REFERENCE TO RELATED APPLICATIONS

This application is a national phase entry under 35 U.S.C. § 371 of International Application No. PCT/EP2014/067088, filed Aug. 8, 2014, which claims the benefit of German Application No. 10 2014 102 487.7, filed Feb. 26, 2014 and German Application No. 10 2013 108 802.3, filed Aug. 14, 2013. The entire contents of each of the foregoing patent applications are hereby incorporated by reference.

BACKGROUND OF THE INVENTION

1. Field of the Invention. The invention relates to a process for reducing the radioactive contamination of the surface of a component which is used in a nuclear reactor and is in contact with radioactively contaminated water.

2. Background and Relevant Art. Said component is, in a first process variant, a constituent of a water-conducting circuit of a nuclear power station, i.e., in particular, of the primary circuit of a pressurized water reactor, a boiling water reactor or a heavy water reactor, i.e. generally the cooling circuit system of a nuclear reactor, and, in a second process variant, a component which comes into contact with radioactive water during maintenance work on the reactor or on the circuit system, i.e. a tool or a tank wall. In either case, contamination of the component surface takes place as a result of the direct contact with radioactive water. It is therefore absolutely necessary to subject the interior surfaces of the circuit system to time-consuming and costly decontamination before carrying out maintenance work. A corresponding situation applies to surfaces which have been contaminated during the course of maintenance work.

BRIEF SUMMARY OF THE INVENTION

It is therefore an object of the invention to propose a process by means of which contamination of a component surface is reduced and, as a result, the outlay for cleaning and decontamination, which also includes the disposal of decontaminated cleaning solutions, is decreased.

This object is achieved by a process as claimed in claim 1. It has surprisingly been found that a hydrophobic film displays, in particular also under the conditions of load operation of a nuclear reactor, a filter effect toward, inter alia, ions present in the coolant. The attachment of radioactive nuclides on a component surface, which would lead to radioactive contamination or to an increase in the dose rate of the component, is thus prevented or at least hindered. In the case of the second process variant, there is therefore the advantage that surfaces, in particular of tools, which come into contact with radioactively contaminated water during inspection work, which would be associated with corresponding exposure of the personnel carrying out the inspection work to radiation, are not radioactively contaminated or at least radioactively contaminated to a decreased extent. In addition, the outlay for cleaning the tools is reduced.

In the case of the second process variant, it was, furthermore, surprising that an oxide layer which affords corrosion protection is formed under the hydrophobic film, i.e. between the film and the metallic component surface, but this has no radioactivity, or at least a lower radioactivity than is the case when a conventional procedure is employed, because of the absence of or at least reduced incorporation of radio nuclides originating from the radioactive water or coolant during the course of the growth of the oxide layer. A further advantage is that the amount of radio nuclides in the waste to be disposed is reduced in a later decontamination of a water-conducting circuit in which the oxide layer is removed by means of a chemical cleaning solution from the component surfaces.

BRIEF DESCRIPTION OF THE DRAWINGS

The invention will now be illustrated with reference to the accompanying drawings. The drawings show.

DETAILED DESCRIPTION

Figure 1:
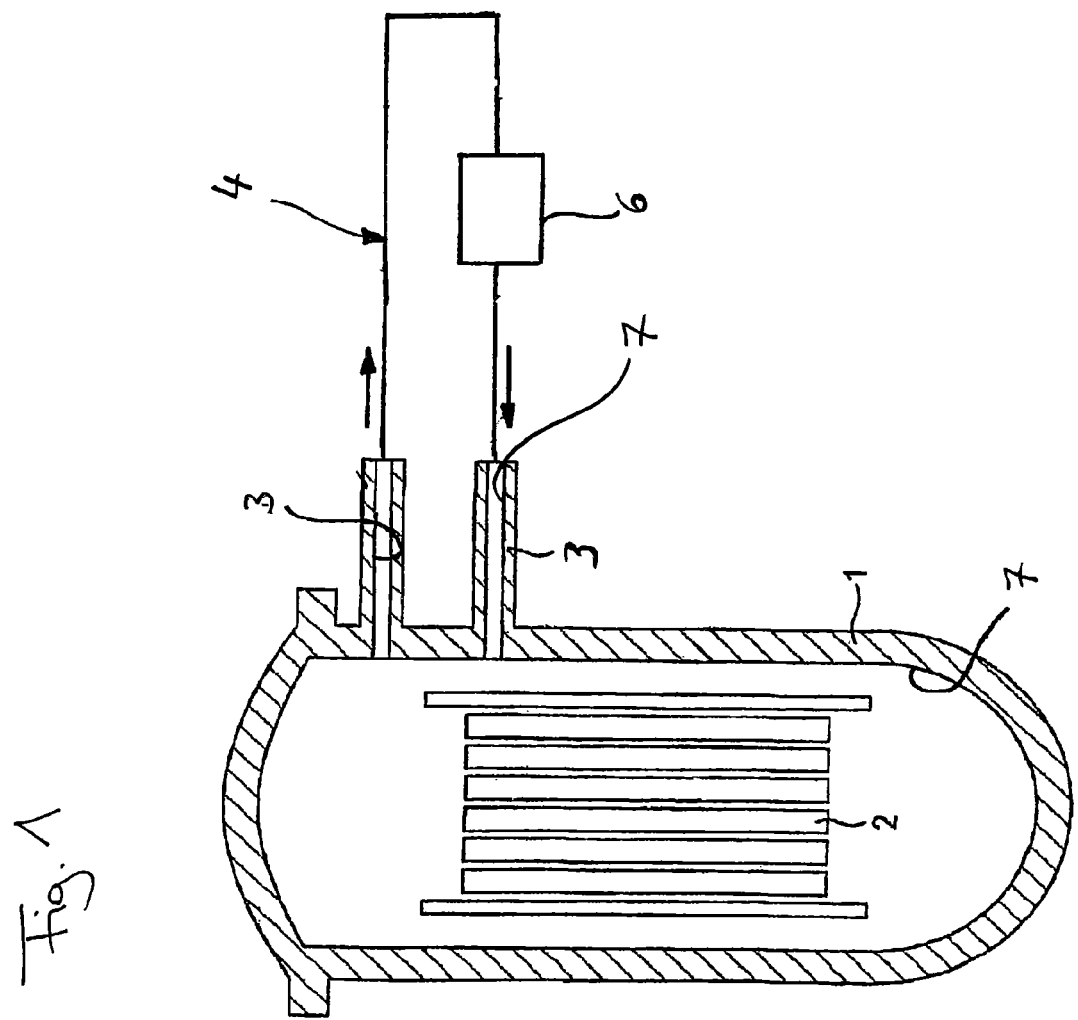
FIG. 1 a highly schematic depiction of the primary circuit of a pressurized water reactor, FIG. 2 a graph which presents the result of a test, FIG. 3 a flooding tank whose wall is provided with a hydrophobic film, FIG. 4 a tool configured as an immersible vehicle whose surface is provided with a hydrophobic film.
Figure 2:
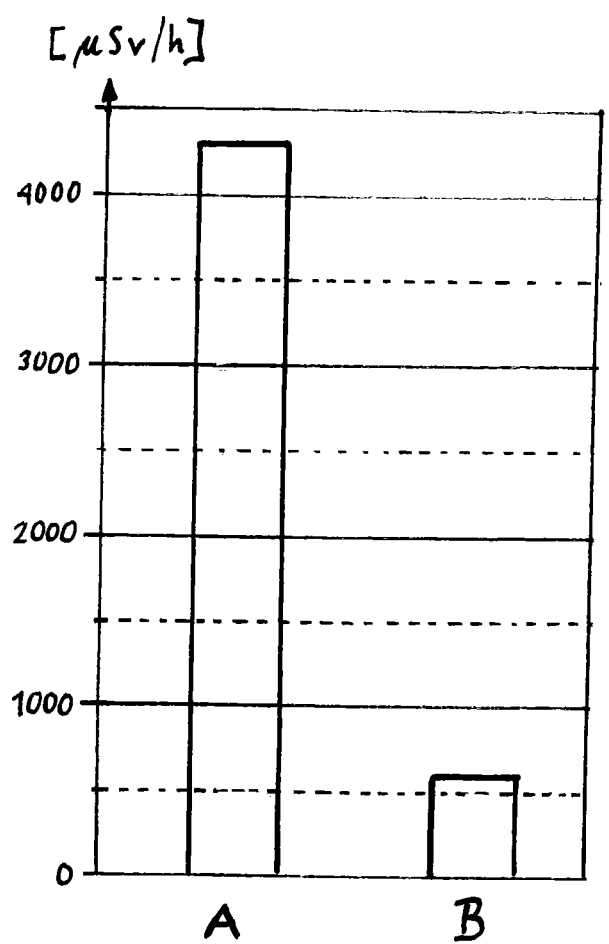
Figure 3:
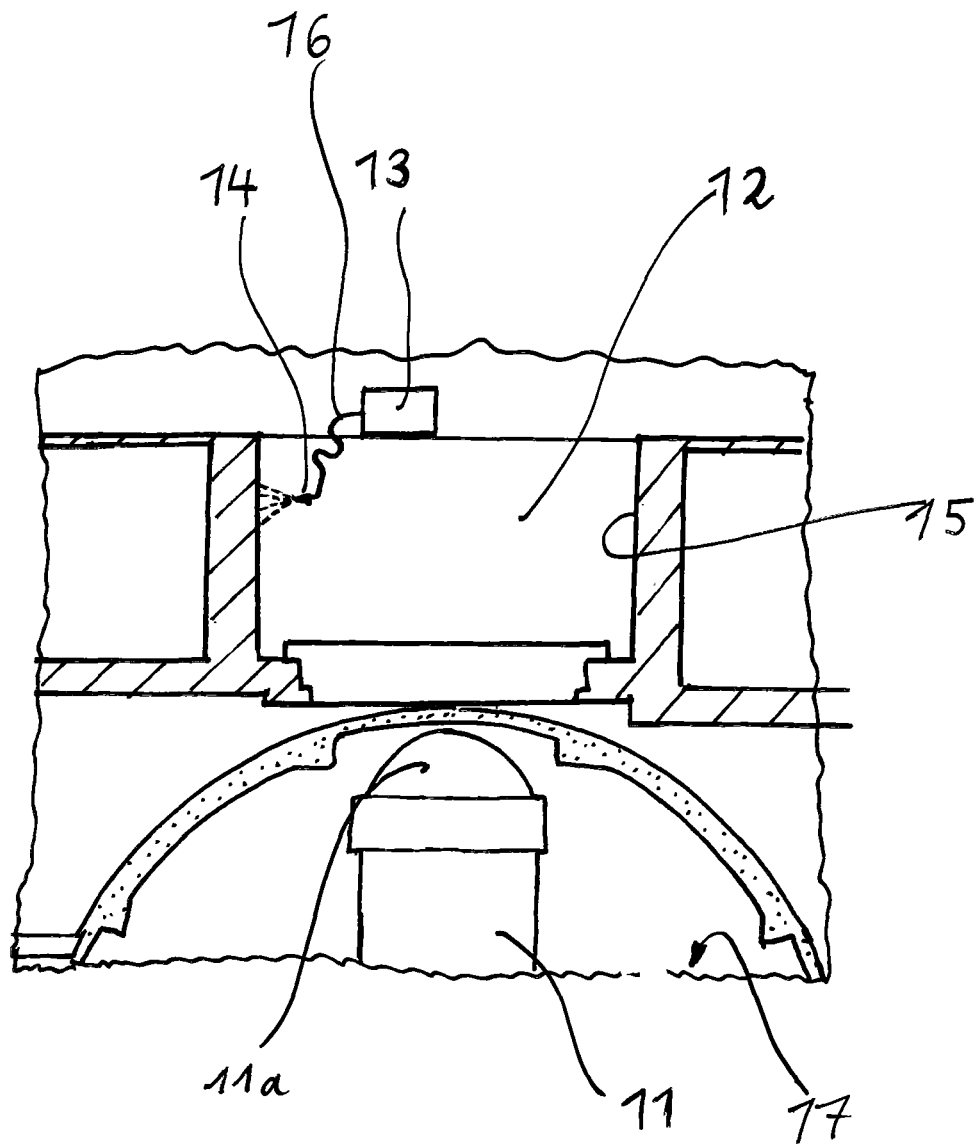

Under the conditions of load operation of a nuclear reactor, unalloyed and low-alloy steels and even stainless steels, e.g. austenitic FeCrNi steels, of which the piping system of the cooling circuits consists, Ni alloys of which, for example, the exchanger tubes of steam generators consist and other alloys used, for instance, coolant pumps, e.g. cobalt-containing components, display a certain solubility in water. The metal ions leached from the alloys mentioned go with the coolant stream into the pressurized vessel of the reactor where they are partly converted by the neutron radiation prevailing there into radioactive nuclides. The nuclides are in turn distributed by the coolant stream throughout the entire coolant system and are incorporated into oxide layers which form on the surfaces of components of the coolant system during operation. With increasing time of operation, the amount of the deposited activated nuclides adds up, so that the radioactivity or the dose rate increases on the components of the coolant system.

Before monitoring, maintenance, repair and retreat measures can be carried out on the coolant system, it is necessary to reduce the radioactive radiation of individual components or of the total circuit system in order to reduce exposure of the personnel to radiation. This is achieved by removing, preferably completely, the oxide layer present on the surfaces of the components by means of a decontamination process. In such a decontamination, either the total coolant system or a part thereof which has been separated off by means of, for instance, valves is filled with an aqueous cleaning solution or individual components of the system are treated in a separate vessel containing the cleaning solution, resulting in the oxide layer dissolving. The metal ions which have gone over from the oxide layer into the solution can then be removed from the solution by passing the latter over an ion exchanger. A problem here is, in particular, the large amount of radioactive waste formed, the disposal of which is complicated and associated with high costs.

In the first process variant, a hydrophobic film composed of an amphiphilic substance is produced on a surface of a component of the circuit which is in contact with the radioactively contaminated water or the reactor coolant. For this purpose, a film-forming agent of the abovementioned type is introduced into the water or coolant present in the circuit. Here, an ongoing introduction, in particular also during load operation of the reactor, is not provided. Rather, film formation is stopped when a closed hydrophobic film has been formed on the component surfaces. It has surprisingly been found that the hydrophobic film has a certain permeability to water molecules but not to nonpolar molecules such as oxygen. Water molecules can thus penetrate to the component surface so that an oxide layer can be formed there; because of the absence of oxygen, this consists essentially of magnetite. This results in the advantage that a protective oxide layer is formed but this has a reduced radioactivity because of the filter effect of the film in respect of radioactive nuclides and colloids.

The respective surface on which a hydrophobic film is to be produced can be metallically clean or have an oxide layer which has previously been formed in reactor operation or in another way. In the first case, the film is applied to a surface which has essentially been freed of an oxide layer by means of a decontamination process or to the surface of a new component which is to be installed or has been installed in the circuit.

It is particularly advantageous for the first process variant to be carried out after a part-circuit or full-circuit decontamination of the cooling circuit has been carried out or to be carried out in the case of a new component which replaces a previously installed component. The corresponding component surfaces are then not coated with any appreciable oxide layer at the point in time when a hydrophobic film is produced and have little or no radioactive contamination, so that the abovementioned advantageous effects are particularly pronounced. The production of a film on an existing oxide layer is advantageous when the oxide layer is an oxide layer produced according to the invention, i.e. an oxide layer which has been formed under a hydrophobic film applied to the surface when the latter has become entirely or partly detached after a prolonged period of operation.

The introduction of the film-forming amphiphilic substance into the coolant is preferably carried out at a point in time outside load operation of the reactor, i.e. in a phase in which the power level of the reactor has not yet been brought to the critical state. Owing to the greatly reduced radiation intensity in the pressure vessel of the reactor compared to load operation, the risk of radiolytic degradation of the amphiphilic substance is reduced. Thus, the hydrophobic film can, for example, be produced during the start-up phase of the reactor, with it being possible to conclude film formation before the radiation level has risen to a level which is damaging to the amphiphilic substance. Film formation can also be carried out during the course of an inspection measure during which the fuel elements are removed from the pressure vessel of the reactor. To ensure that no multilayer films are formed, the area to be covered by a film can be calculated and a corresponding amount of amphiphilic substance can be introduced into the coolant. As described in WO 2013/127844 A1, the course of the concentration of the amphiphilic substance can also be employed as an indicator of a closed unimolecular film having been formed and, for example, the introduction of the stated substance can be stopped when the concentration of this in the coolant has attained a value of from 1 ppm to 2 ppm at at least one measurement point.

In a further preferred embodiment of the first process variant, at least one depot substance is applied to the surface of a component of the cooling circuit before production of hydrophobic film. In the present context, a depot substance is a chemical compound or an element, for example a noble metal such as platinum, which has an influence on an oxide layer being formed on the component surface. The depot substance or a precursor thereof is introduced into the coolant and is distributed by the coolant flowing through the cooling circuit over the entire circuit or a region thereof which has been separated off. The depot substance is deposited on the surface of a component when, for example, reductive conditions prevail in the coolant. The procedure mentioned makes it possible, quite generally, to protect the depot substance present on the component surface or a corresponding depot layer against the action of an agent present in the coolant under the conditions during the start-up phase of the reactor or in load operation by means of the hydrophobic film covering the depot substance or layer, for instance to prevent a reaction which, for example, would result in chemical transformation of the depot layer or formation of undesirable reaction products.

The embodiment in question is particularly advantageous when salts of chromic acid, for example iron chromate or zinc chromate are to be introduced into the coolant to produce a depot layer. The hexavalent chromium of the salts mentioned is reduced to trivalent chromium at the surface of the components by interaction with the iron of the components as reactant, so that chromites are deposited on the component surface. The trivalent chromium is incorporated into the oxide layer growing on the surface, forming chromium-rich spinel oxides having a strong protective effect. During the start-up phase of the nuclear reactor, oxidative conditions prevail in the coolant because of, for instance, oxygen or hydrogen peroxide dissolved therein, which leads to oxidation of the deposited chromite to soluble chromate, i.e. to a reversal of the abovementioned reaction, during the start-up phase of the reactor. According to the invention, this is, however, prevented by the hydrophobic film so that when reductive conditions prevail again in the cooling circuit at the latest toward the end of the start-up phase, the chromite previously deposited on the component surfaces is present in an undecreased amount.

In the case of a platinum depot layer, there is a risk of contact corrosion occurring because of, for instance, incomplete coating of the component surfaces with platinum. In contact corrosion, two different metallic elements come into contact with one another in the presence of an electrolyte. Here, the less noble material, in the present case surface regions of the component which have not been doped with platinum, is oxidized. This can be prevented effectively by means of a hydrophobic film of the type in question which forms a barrier covering even undoped surface regions against oxygen dissolved in the coolant. In order to prevent contact corrosion from occurring even during production of the platinum depot layer, the treatment with platinum is carried out under reducing conditions.

The primary circuit of a pressurized water reactor as shown in FIG. 1 comprises a reactor pressure vessel 1 in which fuel rods 2 are located. A piping system 4, in which various components, for example a steam generator and a coolant pump (not shown), are installed, is connected via connection ports 3 to the reactor pressure vessel 1. The components are symbolized by the rectangle 6 in FIG. 1. The introduction of an amphiphilic substance which forms a hydrophobic film on the surfaces of the primary circuit, hereinafter referred to as a film former for short, is effected, for example, during the start-up phase of the reactor. If the formation of a film on the interior surfaces of the reactor pressure vessel 1 and the surfaces of the fuel rods 2 is not wanted, the reactor pressure vessel 1 can be fluidically separated from the remaining cooling circuit. The metering system (not shown) dedicated to the plant can be used for introduction of the film former.

The production of a hydrophobic film on the surfaces of the cooling circuit is preferably carried out after a full-circuit or part-circuit decontamination or when a component is removed from the circuit and replaced by a new one. In the latter case, the surface of the new component is essentially still clean, i.e. not yet coated by an oxide layer as is formed during load operation of the reactor. The introduction is carried out at temperature above the Krafft temperature of the amphiphilic substance used, i.e. above about 70° C.

With increasing temperature and thus increasing Brownian molecular motion, the van der Waals bonds between the nonpolar groups can break to form gaps, so that water molecules can get into these gaps, with the water molecules being attracted, owing to their dipole character, by the electric potential prevailing at the surface of the components or in the region of the polar group of the hydrophobic film. However, contamination of the oxide layers which form between the film and the component surfaces by incorporation of radioactive substances does not take place or at the outside takes place to a small extent even at high temperatures. In the case of ionic radionuclides, this is presumably due to the fact that, due to their charge, these have a relatively large hydration shell and thus an effective size which at least hinders passage through the hydrophobic film.

The buildup of radioactivity in oxide layers which form is also due to the attachment or incorporation of colloids containing radioactive nuclides. Colloids which have a size or a radius of from about 1 nm to 1000 nm are an order of magnitude larger than hydrated ions, so that passage through the hydrophobic film is virtually ruled out. During the start-up phase of the reactor and also during subsequent load operation, formation of oxide layers which have a significantly reduced radioactivity compared to oxide layers in the case of a conventional mode of operation, i.e. oxide layers which are in direct contact with the coolant, is thus possible.

Owing to the radionuclides transported with the coolant, some radioactive radiation prevails in the piping system or in the components installed therein. However, this is comparatively low, so that radiolytic degradation of the organic groups of the film does not have to be feared.

To obtain the above-described protective effects of the hydrophobic film, it is sufficient for this to be present in a unimolecular layer on the component surfaces. To achieve this, it is firstly advantageous to take into account the geometric surface area of the circuit system or a section thereof when calculating the required amount of film former. Depending on the type and running time of the plant, the surfaces of the cooling circuit have a more or less strongly pronounced roughness, which can be taken into account by a factor of, for example, from 1.5 to 2.5. The amount of film former calculated for the geometric surface area is then multiplied by this factor. During introduction of the film former, it is advantageous to determine or measure the concentration of the film former in the coolant at a plurality of places distributed over the cooling circuit. The amphiphilic molecules have a greater bonding affinity to metallic clean surfaces or surfaces having an oxide layer than to surface regions which are already coated with a hydrophobic film. This leads to, at a constant introduction rate, the concentration of the film former in the coolant firstly decreasing and later reaching, with an asymptotic concentration profile, an essentially constant concentration of film former of, for example, 1 ppm. A complete, essentially unimolecular layer of film former has then been formed on the component surfaces.

In a test, specimens of carbon steel ASME SA179 in the form of 7.3 cm long tube halves were placed in the circuit system of a boiling water reactor and thus exposed to the conditions of load operation of the reactor. The specimens were cleaned beforehand, i.e. their surface corresponded essentially to a state which is present on the interior surfaces of the circuit system after chemical decontamination. In addition, a film of octadecylamine was applied beforehand to a part of the specimens. For this purpose, the specimens were positioned in an experimental circuit and the specified amphiphilic substance was introduced into the water having a temperature of about 80° C. circulating therein.

After three months, the specimens were taken from the circuit system of the boiling water reactor and their surfaces were examined. An oxide layer which consisted at least predominantly of hematite and thus had a red color had formed on the untreated specimens. An oxide layer was likewise present on the treated specimens, i.e. the specimens coated with a hydrophobic film, but this layer had a black color, i.e. it consisted predominantly of magnetite. The hydrophobic film present on the treated specimens had thus prevented access of oxygen to the metallic surface of the specimens. Water molecules which, at least at high temperatures as prevail during load operation of the reactor, penetrate through the nonpolar radicals projecting into the water of the film covering the surfaces of the specimens and thus reach the metal of the specimens served virtually solely as oxygen supplier for magnetite formation.

The dose rate of the specimens was determined by means of a gamma sensor. Here, it was found that the dose rate of the untreated specimens was 4300 μSv/h and that of the treated specimens, i.e. the specimens covered with a film of the type in question, was a multiple lower at 580 μSv/h.

As mentioned above, it is advantageous for film formation to occur outside the operating phase of the reactor, for instance after inspection or maintenance work. The film can then form at relatively low temperatures and especially without the influence of radiation prevailing during reactor operation. This situation was simulated in the test described by the specimens being provided with a hydrophobic film in the absence of radiation in a laboratory plant. The oxide layer which forms under the film is, as optical comparison of the treated and untreated specimens A and B indicated, significantly more uniform and with fewer gaps. The oxide layer therefore offers greater protection against corrosion than is the case for the oxide layer of the untreated specimens A. The reason for the different film quality for the A and B specimens could be that the amphiphilic substance acts like a surfactant, so that particles adhering to the component surfaces go over into the coolant and the surfaces are thus cleaned before or during film formation.

Even when the film is no longer effective after a certain operating time, the oxide layer present, which has a low dose rate, will grow only relatively slowly since the transport of agents which have an oxidizing action, e.g. water and oxygen, through the dense oxide layer to the metal forming the basis of a component is hindered. It is also possible to renew the film by introduction of an amphiphilic substance into the water or the reactor coolant after a certain operating time.

Apart from radioactive nuclides in ionic form, it is also possible for radioactive colloids, i.e. particles having a size of from about 1 nm to 1000 nm, to be present in the water. Colloids of solids are generally charged, i.e. they bear a positive or negative charge on their surface. If an amphiphilic substance which has a polar group having a charge of the same sign is used, the colloid does not adhere to the film surface because of the Coulombic repulsion. An example of a radioactive colloid is a colloid consisting of Ag 110 m. The silver originates, for example, from seals, for instance the lid seal of the reactor pressure vessel. Use of an amphiphilic substance having a polar group bearing a charge of the same sign as the colloids present, preferably an amino group, for instance a quaternary amino group, in the case of positively charged colloids and a phosphonic acid group in the case of negatively charged colloids, enables the attachment of radioactive colloids to surfaces of tools or to surfaces of components of a water-conducting circuit of the reactor to be prevented or at least be reduced.

The second process variant relates to the inspection phase of a nuclear reactor, and is thus an inspection process, i.e. a process for carrying out maintenance and servicing work, for a nuclear reactor, in particular for a boiling water reactor, a pressurized water reactor or a heavy water reactor. Nuclear reactors have to be subjected to an inspection after a particular period of operation, for example annually, in which not only the abovementioned work but also checking measures are carried out. During an inspection, the reactor pressure vessel 11 of the reactor, in which the fuel elements (not shown) are located, is usually opened by removing the lid 11a thereof. For radiation protection reasons, a flooding tank 12 arranged above the reactor pressure vessel 11 is flooded. Measures of the abovementioned type can then be carried out in the reactor pressure vessel 11 and on the associated components and systems from a working platform (not shown) arranged above the flooding tank 12.

A problem with inspection work is that it is not possible to prevent reactor coolant mixing with the water of the flooding tank 12 and possibly further tanks such as fuel element storage tanks and radioactivity thus being carried into regions outside the opened reactor pressure vessel 11. Although the water which has been contaminated in this way can be removed from the respective tanks and other compartments after the inspection, radionuclides remain adhering to the tank walls 15 and lead to increased radioactive contamination or dose rate. Depending on the type of the material of the walls, which are, for example, lined with stainless steel, the radionuclides adhere more or less strongly, so that complicated cleaning measures may be necessary, leading to an increase in the exposure of the operating personnel to radiation. A similar problem occurs in the case of instruments such as manipulators, tools and auxiliary constructions whose, for example metallic, surfaces which come into contact with radioactively contaminated water during the course of the inspection, in particular are used within the reactor pressure vessel 11. Such instruments are frequently provided by the servicing companies carrying out the inspection, i.e. are transported away again after conclusion of the inspection work and used in other nuclear power stations. However, even when the instruments remain in the control region of the nuclear power station, exposure of the personnel to radiation as a result of the inspection is a problem because the instruments generally have to be stored, serviced or, in the most unfavorable case, disposed of there. The abovementioned instruments therefore have to be subjected to a particularly thorough decontamination.

Such a decontamination is made unnecessary, or at least can be carried out in a simpler way, when a hydrophobic film consisting of an amphiphilic substance or containing such a substance is produced on the component surfaces, i.e. the walls 15 of storage tanks 12 and the surface of tools, before the surfaces come into contact with radioactively contaminated water, in particular the primary coolant of the reactor.

The film can be applied to the surfaces in various ways, with preference being given to dipping the instruments into a solution containing the film-forming substance or spraying the surfaces with such a solution, because these can be carried out with a small outlay.

The abovementioned flooding tank 12 located above the reactor pressure vessel 11, or a tank or container generally, can be provided with a hydrophobic film in a simple way by means of a spraying process. This merely requires a, e.g. commercial, spraying instrument 13 which comprises a spray nozzle 14 to be directed at the tank wall 15 and a hose 16 connecting this to the spraying instrument. An aqueous solution containing the film-forming substance is applied to the walls 15 by means of the spray nozzle 14. After the film has been applied to the tank wall, the annular space 17 surrounding the reactor pressure vessel 11 and the flooding tank 12 is flooded.

Figure 4:
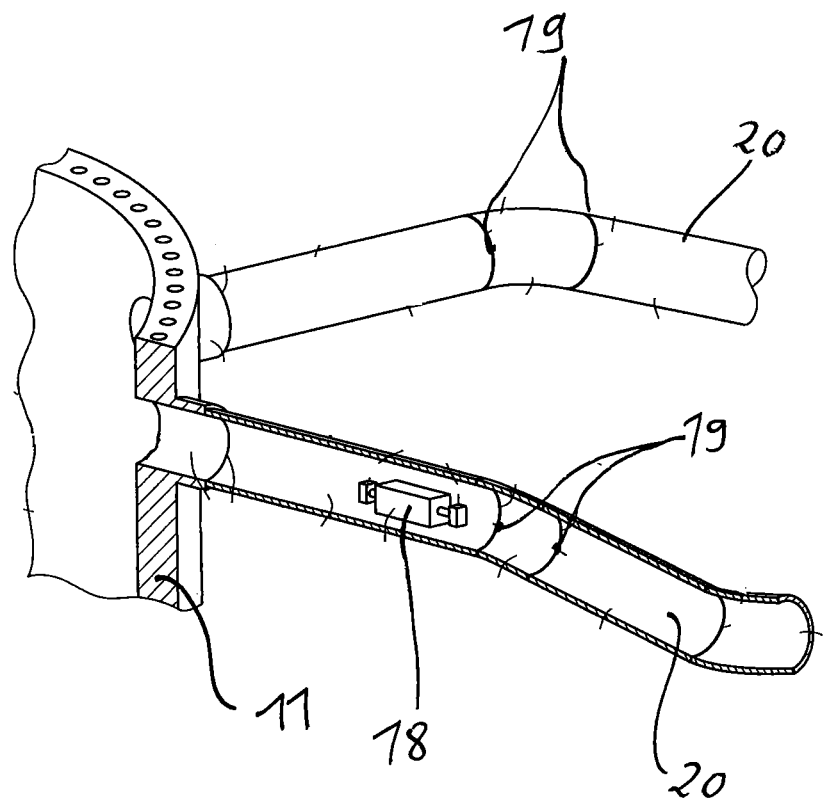

An example of a tool used during an inspection is shown in FIG. 4. This is a remotely controlled immersible vehicle 18 which serves, for example, to check welding seams 19 of the main coolant lines 20. A hydrophobic film is applied to the surface of the immersible vehicle 18 by, for example, spraying with a solution containing a film-forming substance. However, it is also conceivable for the immersible vehicle 18 to be introduced into a tank or into a treatment bath which is filled with an aqueous solution containing the film-forming substance.

The concentration of the film-forming substance in the aqueous solution in the case of a spraying or dipping process is, for example, in the range from 1 ppm to 800 ppm. When the solution is applied to a surface, an elevated temperature, i.e. a temperature above room temperature, for instance up to 90° C., is advantageous.

A possible film-forming substance in the first and second process variants is a chemical compound which has a polar end formed by at least one polar group and a nonpolar end formed by at least one hydrocarbon radical. The polar end serves as anchor group by means of which the substance adheres to the metallic surface, or surface coated with an oxide layer, of a component. The nonpolar end projects into the radioactive water.

The nonpolar end of the amphiphilic substance has a carbon chain, preferably an aliphatic group, having from 8 to 22 carbon atoms. The polar part is, for example, an acid group, e.g. a sulfonic acid, phosphoric acid, phosphonic acid or carboxyl group, or a derivative of the groups specified. Further possibilities as polar group are a hydroxyl group (thiols) or a basic group such as a primary, secondary, tertiary or quaternary amino group, an imine group or a derivative of the groups specified. Examples of amphiphilic substances which are well-suited to the purpose in question are alkylamines and alkylphosphonic acids.

To improve the attachment of the amphiphilic substance to the surface of a circuit component, the aqueous solution containing the amphiphilic substance is, in one process variant, influenced in such a way that the charge on the surface resulting from the electrochemical double layer at the metal/solution interface brings about a very large Coulombic attraction of the polar group of the amphiphilic substance. The charge on the surface can be influenced to a certain extent by the choice of the temperature. An alteration of the charge or an increase in the charge is preferably effected via the pH of the solution. Proceeding from a zero charging point, at which the surface has at least no appreciable charge, an increasingly positive surface charge can be brought about by lowering the pH and an increasingly negative surface charge can be brought about by increasing the pH. In the case of strengthening of the charge, a surface charge opposite to the charge on the polar group is already present.

It is advantageous to use amphiphilic substances whose polar groups behave in terms of charging in a manner opposite to the surface. Thus, in the case of a positively charged surface, which is generally established in acidic solution, a phosphonic acid group, for example, is suitable as polar group which is negatively charged under said conditions. On the other hand, in the case of negatively charged surfaces, an amphiphilic substance having a positively charged polar group, for example a quaternary amino group, is used.

The invention claimed is:

1. A process for reducing radioactive contamination of a surface of a component which is used in a nuclear reactor and is in contact with radioactively contaminated water, comprising: producing a hydrophobic film on the surface of the component by wetting the surface with an aqueous solution containing a film-forming amphiphilic substance that comprises a primary, secondary, tertiary or quaternary amino group as a polar group, wherein the hydrophobic film prevents at least some radioactive particles from adhering to the surface of the component.

2. The process as claimed in claim 1, characterized in that the hydrophobic film is produced on an interior surface of the component, the component comprising a water-conducting circuit of the nuclear reactor.

3. The process as claimed in claim 2, characterized in that the hydrophobic film is produced after a part-circuit or full-circuit decontamination of the water-conducting circuit.

4. The process as claimed in claim 2, further comprising replacing the component with a new component, and forming a new hydrophobic film on the new component.

5. The process as claimed in claim 2, further comprising introducing a chemical compound or element into the aqueous solution that forms at least one layer on the surface before production of the hydrophobic film.

6. The process as claimed in claim 5, characterized in that the chemical compound or element is a noble metal.

7. The process as claimed in claim 5, characterized in that the chemical compound or element is a salt of chromic acid.

8. The process as claimed in claim 1, characterized in that the hydrophobic film is produced at a point in time outside load operation.

9. The process as claimed in claim 8, characterized in that the hydrophobic film is produced during a start-up phase of the nuclear reactor.

10. The process as claimed in claim 1, wherein the component is a tool used for inspecting the nuclear reactor.

11. The process as claimed in claim 10, characterized in that the tool is dipped into an aqueous solution of the amphiphilic substance.

12. The process as claimed in claim 10, characterized in that the surface of the tool is sprayed with an aqueous solution of the amphiphilic substance.

13. The process as claimed in claim 1, characterized in that an application of the amphiphilic substance to the surface is stopped when the surface has been covered with the hydrophobic film.

14. The process as claimed in claim 1, characterized by use of an amphiphilic substance which has a polar end formed by at least one polar group and a nonpolar end formed by at least one hydrocarbon radical.

15. The process as claimed in claim 1, characterized in that the contaminated water contains radioactive colloids and a film is produced by means of an amphiphilic substance which has a polar group having a charge having a same sign as the charge on the radioactive colloids.

16. The process as claimed in claim 1, characterized in that an amphiphilic substance which contains an aliphatic group as nonpolar radical is used.

17. The process as claimed in claim 1, characterized by a nonpolar radical having from 8 to 22 carbon atoms.

18. The process as claimed in claim 1, wherein producing the hydrophobic film on the surface of the component is performed before the surface comes into contact with radioactively contaminated water.

19. The process as claimed claim 14, characterized in that the aqueous solution is influenced in such a way that a charge which is opposite to the charge of the polar group of the amphiphilic substance arises on the surface or that a surface charge opposite to that of the polar group of the amphiphilic substance is increased.

20. The process as claimed in claim 19, characterized in that an influence on the aqueous solution is exerted via a pH of the aqueous solution.

21. A process for reducing radioactive contamination of a surface of a component which is used in a nuclear reactor and is in contact with radioactively contaminated water, comprising: producing a hydrophobic film on the surface of the component, before the surface comes into contact with radioactively contaminated water, by wetting the surface with an aqueous solution containing a film-forming amphiphilic substance, wherein the hydrophobic film prevents at least some radioactive particles from adhering to the surface of the component.

* * * * *